Figure 2:
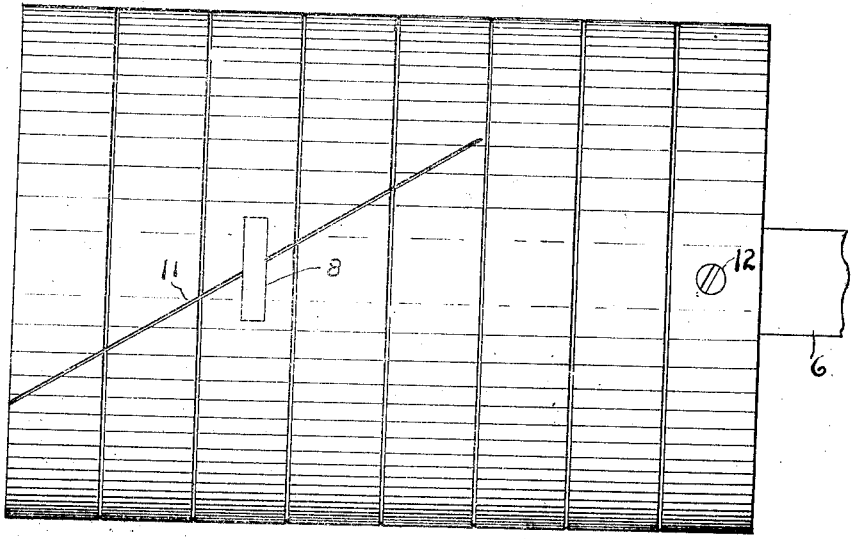

R. D. CROW.
PISTON.
APPLICATION FILED MAR. 22, 1921.

1,411,843.

Patented Apr. 4, 1922.

ROBERT DOUGLAS CROW, INVENTOR.

BY Jesse R. Stone

His ATTORNEY.

UNITED STATES PATENT OFFICE.

ROBERT D. CROW, OF HOUSTON, TEXAS.

PISTON.

1,411,843. Specification of Letters Patent. Patented Apr. 4, 1922.

Application filed March 22, 1921. Serial No. 454,398.

*To all whom it may concern:*

Be it known that I, ROBERT D. CROW, a citizen of the United States, residing at Houston, Harris County, Texas, have invented a certain new and useful Improvement in Pistons, of which the following is a full, clear, and exact description, such as will enable others skilled in the art to which it appertains to make and use the same.

My invention relates to pistons and has particular application to pistons for use in internal combustion motors.

In such motors the piston must be adapted to operate under high speed and be subjected to high temperature. Because of its speed of operation and because it must be stopped and returned at the end of each stroke, the inertia of a heavy reciprocating piston causes excessive vibration in the engine and a rapid wear on the bearings of the wrist pin and connecting rod.

To overcome this difficulty, piston have been made of aluminum or its alloys because of its quality of light gravity. Aluminum, however, has a greater co-efficient of thermal expansion than has the cast iron cylinder in which the piston operates. As a result the aluminum piston must be made appreciably smaller than the interior dimensions of the cylinder to allow for the said greater expansion of the piston. This leads to poor compression and to leakage of gas and oil past the piston. Furthermore, aluminum wears excessively when highly heated and the loose fit soon becomes exaggerated. Composite pistons of aluminum and cast iron have been made in an effort to combine the advantages of lightness of material and greater heat conductivity found in aluminum with the small co-efficient of expansion of cast iron. Leakage of oil and gasoline past the pistons has not been entirely eliminated, however.

The object of my invention is to provide a piston which will be light in weight and adapted to preserve a close fit with the cylinder walls at all times.

Another object is to construct a piston which will preserve a tight sliding fit with the cylinder walls and still avoid the usual rapid wear of the cylinder.

These and other objects and advantages, which will more clearly appear in the description which follows, are accomplished by constructing the body of the piston of a metal of light specific gravity, such as aluminum, and fitting outside said light weight piston a thin sleeve of cast iron which will preserve a close fit with the cylinder and yet allow expansion of the piston without danger of "seizing" when the piston becomes heated. Also, by placing the sleeve in close contact with the cylinder walls and fitting the piston rings between the aluminum body and the sleeve I not only get a piston which will not leak, but one in which the piston rings do not scrape on the cylinder thus avoiding wear of both the rings and the cylinder walls.

Figure 1:
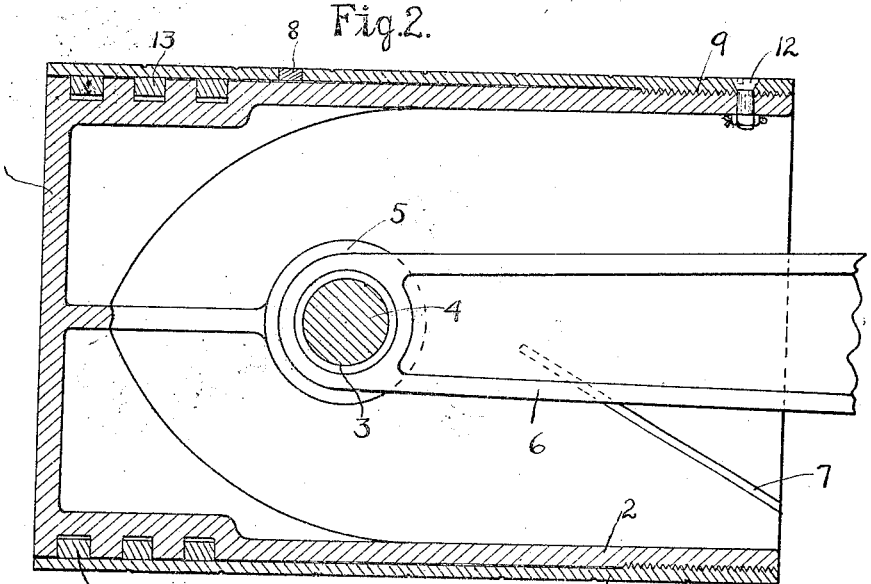

Referring to the drawing forming a part of this specification, and wherein like numerals of reference are applied to like parts throughout the several views, Fig. 1 is a central longitudinal section through a piston embodying my invention, and Fig. 2 is a side elevation thereof. My improved piston is made up of a piston head 1, which is preferably made of aluminum or some alloy of aluminum, so as to obtain a light weight body for the piston. This head is of the trunk type having a forward closed end. It has a rearwardly extending skirt 2 thereon which projects backwardly for a sufficient distance to furnish a guide to prevent lateral slapping movement. On opposite inner sides of the hollow cylindrical head thus formed I provide the usual bearings 3 for the wrist pin 4. These bearings are formed by inwardly extending bosses 5. The wrist pin 4 furnishes attachment for the connecting rod 6 in the usual manner. The rearward end of the skirt 2 is provided with a diagonal kerf or slot 7 to accommodate a certain amount of lateral expansion of the material, due to heat.

The rearward end of the skirt 2 is threaded at 9 for the attachment of an outer cast iron sleeve 10. This sleeve I contemplate forming of an external diameter very closely the same as that of the interior of the cylinder in which the piston works. In fact it is believed that .0005 of an inch clearance between the outer surface of the sleeve 10 at the forward end thereof and the cylinder walls will be sufficient. The piston is preferably tapered slightly toward the rearward end to allow about .003 to .005 of an inch clearance at the smaller end. This close running fit will be practically filled by the lubricant so that no leakage of gas past the same will occur. To provide, however, for a certain amount of expansion of the piston relative to the cylinder, I may form a slot or kerf 11 diagonally in the forward end of the sleeve similar to the kerf 7 in the skirt 2 previously described. This slot may be closed at some intermediate point by a transverse key or plug 8 which will obviously not interfere with the free expansion of said sleeve but will serve to prevent appreciable leakage of gas through the slot. To insure the sleeve 10 against unscrewing upon the threaded portion 9 I may provide a set screw 12 at some point along the threaded portion, the tightening of which within the sleeve and the skirt will prevent loosening.

As will be seen from the drawing, the fit between the sleeve 10 and the piston head 1 is a very loose one so as to provide for a certain amount of expansion of aluminum relative to the cast iron sleeve. To prevent leakage past the piston head and between the same and the sleeve 10, I contemplate using piston rings 13, of some well known and efficient type, to close the space between the two parts. Forming the piston rings within the head so as to bear against the sleeve 10 outside thereof will act also to force the sleeve 10 resiliently against the walls of the cylinder so as to maintain a tight fit at all times. The provision of the slot 11 will however allow the sleeve to expand a certain amount due to the heat, without binding against the cylinder walls. The piston rings will prevent leakage occurring between the sleeve and the head without the usual wear which is caused by scraping of the piston rings upon the cylinder walls. There will in fact be very little wear of the rings as there will be no relatively longitudinal movement of the parts against which they bear. The scraping and scoring of the cylinder walls will therefore be largely avoided. It is believed that with this provision the life both of the piston and the cylinder will be greatly prolonged.

This type of piston will maintain a close sliding fit with the cylinder walls to an extent not exceeded by any cast iron piston now in use. By the use of this piston I obtain the advantages of lightness and greater heat conductivity, due to aluminum, without the disadvantages usually encountered. And, by combining the cast iron sleeve 10 with the aluminum head, so that it covers the entire periphery thereof, there will be no leakage past the aluminum head nor will there be excessive wear upon the aluminum piston itself or upon the cylinder walls. The piston will maintain the desired close fit with the cylinder both when cold or when heated, and the piston will operate efficiently under the varied conditions of temperature and wear to which it is subjected.

While I have illustrated one specific embodiment of my invention, it will be obvious that various changes in form and structure may be made without departing from the spirit of my invention and I do not wish to limit my invention to the particular form shown except in accordance with the claims which follow.

Having thus described my invention, what I claim as new and desire to protect by Letters Patent is:

1. A piston having a head composed of a light gravity material adapted to fit a cylinder loosely, a rearwardly extending skirt having a slot therein, a cast iron sleeve secured to the rear end of said skirt and fitting loosely over said head, said sleeve having a slit therein and piston rings between said head and said sleeve.

2. A piston having a head composed of aluminum, a rearwardly extending skirt thereon having means to allow expansion thereof, a cast iron sleeve secured to the rear end of said skirt and fitting loosely over and completely covering the cylindrical periphery of said head.

3. A piston having a head composed of a light gravity material, a rearwardly extending skirt thereon, an outer sleeve of relatively heavier metal secured to said skirt, and spaced slightly outside said head, and piston rings between said head and said sleeve.

4. A piston having a head of light gravity material, a skirt thereon of relatively heavier, wear resisting material, means to allow expansion of said head relative to said sleeve, and means between said sleeve and said head to prevent leakage therethrough.

5. A piston having a cylindrical head of light gravity material, a skirt secured to one end of said head and loosely enclosing the entire periphery of said head, and means to prevent leakage between said sleeve and said head.

6. In a piston, a head, an outer sleeve enclosing said head, attached thereto and spaced slightly therefrom except at the point of attachment, and piston rings between said head and said sleeve, said sleeve being slit adjacent said rings to allow said rings to press said sleeve resiliently outward.

7. In combination, a cylinder, a piston therein comprising a loosely fitting aluminum piston head, a cast iron sleeve completely enclosing the periphery of said head and secured thereto and adapted to fit snugly against said cylinder, means to allow relative expansion of said head and said sleeve and piston rings to seal the space between said head and said sleeve.

8. A piston having a head, an outer sleeve attached thereto, said sleeve being slotted toward one end thereof and a transverse key or plug closing said slot intermediate the ends thereof.

In testimony whereof, I hereunto affix my signature, this the 19th day of March, A. D., 1921.

ROBERT D. CROW.